(12) United States Patent
Hascoet et al.

(10) Patent No.: US 10,062,881 B2
(45) Date of Patent: Aug. 28, 2018

(54) ELECTRICITY STORAGE UNIT AND ASSEMBLY METHOD FOR SUCH A UNIT

(71) Applicant: Blue Solutions, Ergue Gaberic (FR)

(72) Inventors: Xavier Hascoet, Plougastel Daoulas (FR); Eric Baylard, Le Relecq Kerhuon (FR); Erwan Vigneras, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 19 days.

(21) Appl. No.: 15/029,606

(22) PCT Filed: Oct. 16, 2014

(86) PCT No.: PCT/EP2014/072239
§ 371 (c)(1),
(2) Date: Apr. 14, 2016

(87) PCT Pub. No.: WO2015/055774
PCT Pub. Date: Apr. 23, 2015

(65) Prior Publication Data
US 2016/0268560 A1    Sep. 15, 2016

(30) Foreign Application Priority Data

Oct. 16, 2013 (FR) .................................... 13 60082

(51) Int. Cl.
*H01M 2/10* (2006.01)
(52) U.S. Cl.
CPC ....... *H01M 2/1077* (2013.01); *H01M 2/1083* (2013.01); *H01M 2220/20* (2013.01); *Y02T 90/124* (2013.01)
(58) Field of Classification Search
CPC ..................... H01M 2/1077; H01M 2/1083
See application file for complete search history.

(56) References Cited

U.S. PATENT DOCUMENTS

| | | | |
|---|---|---|---|
| 5,558,949 A | 9/1996 | Iwatsuki et al. | |
| 5,624,770 A * | 4/1997 | Gummelt | H01M 2/0242 429/143 |

(Continued)

FOREIGN PATENT DOCUMENTS

| | | |
|---|---|---|
| FR | 629021 | 11/1927 |
| WO | WO-2011134828 | 11/2011 |

OTHER PUBLICATIONS

International Search Report with English Language Translation, dated Dec. 19, 2014, Application No. PCT/EP2014/072239.

(Continued)

*Primary Examiner* — Stewart A Fraser
*Assistant Examiner* — Rachel L Zhang
(74) *Attorney, Agent, or Firm* — Womble Bond Dickinson (US) LLP

(57) ABSTRACT

The present invention relates to an electricity storage unit comprising a plurality of energy storage cells (1) positioned side by side and a rigid enclosure (10) surrounding said cells (1), comprising two separate parts (100A, 100B), a first part of the enclosure comprising at least one reference wall, in particular made up of a lower wall (110A), the unit comprising:—at least one stop (200, 220, 230) made from an elastically deformable material that comprises at least one so-called main wall (214, 224, 240), extending along a plane essentially normal to the reference wall (110A) and which is positioned between two of the cells (1), such that at least one stop (200, 220, 230) is placed between each pair of adjacent cells (1), and—pressing means (300) designed to bear on a face of each of the cells (1) in order to press each cell (1) against the reference wall (110A), the pressing means (300) being removably fastened to the first part (100A) of the enclosure (10).

24 Claims, 6 Drawing Sheets

(56) References Cited

U.S. PATENT DOCUMENTS

Figure 1:
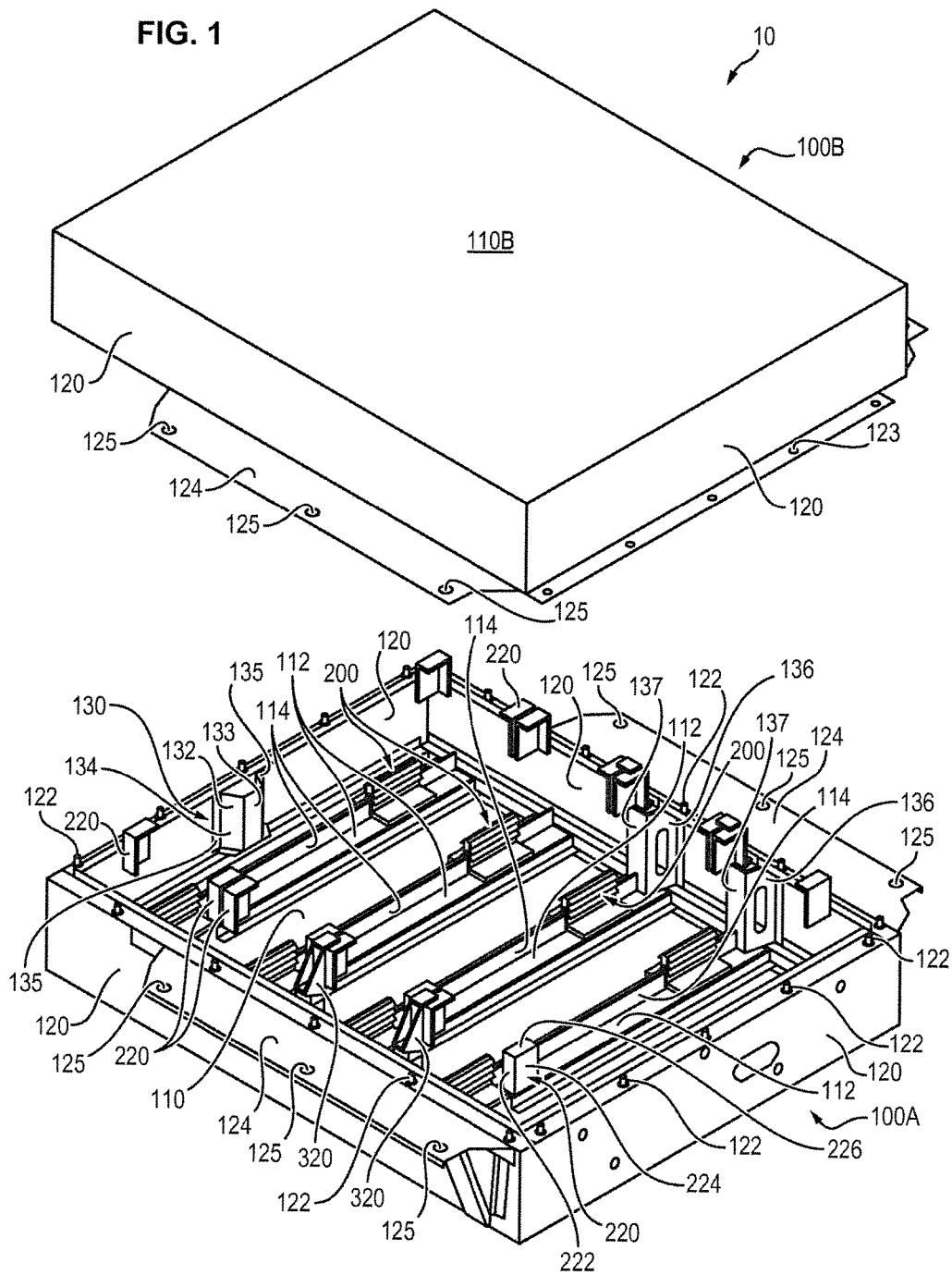

2008/0063934 A1   3/2008   Bechtold et al.
2012/0326665 A1   12/2012  Yin et al.

OTHER PUBLICATIONS

French Search Report, dated Jun. 11, 2014, French Application No. 1360082.

* cited by examiner

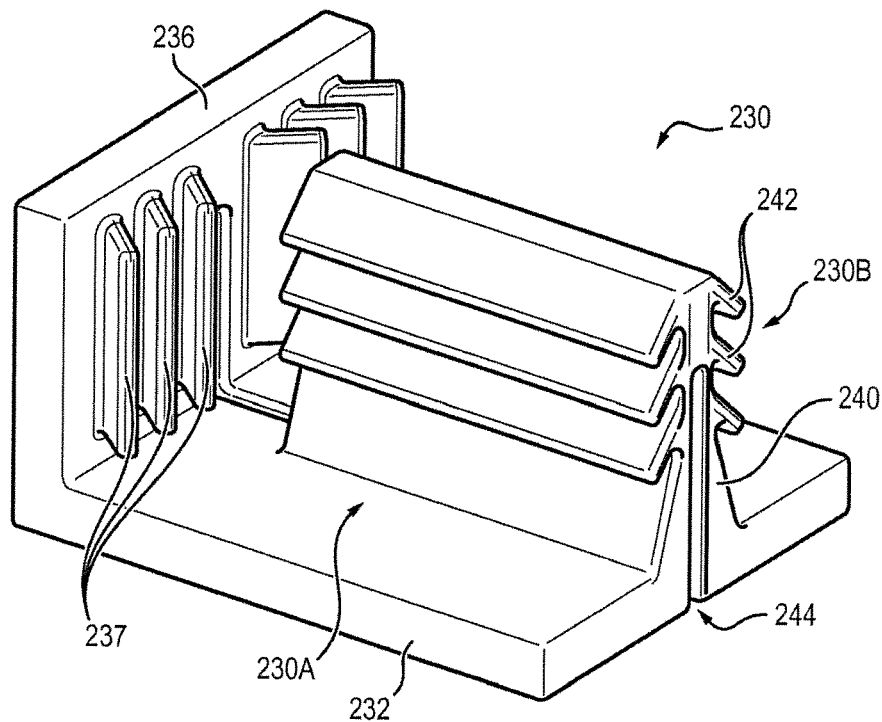
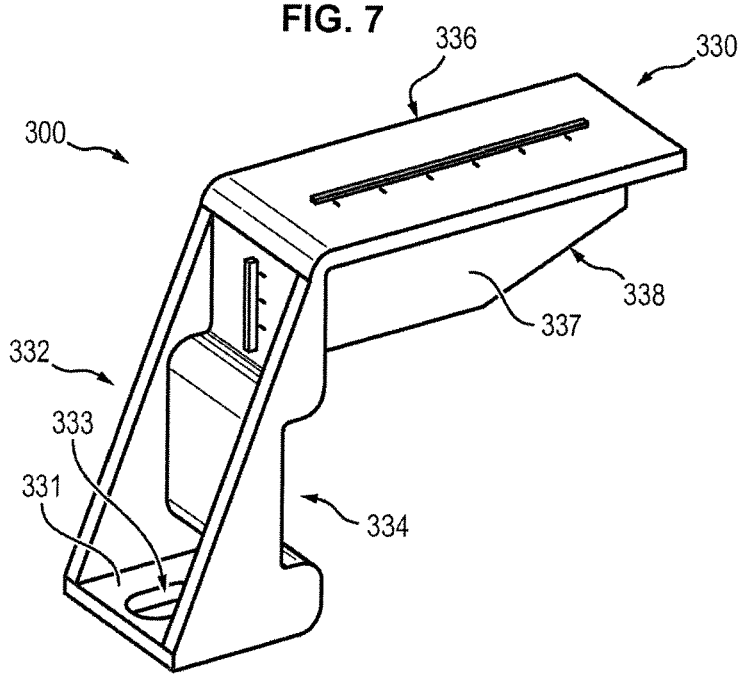

ELECTRICITY STORAGE UNIT AND ASSEMBLY METHOD FOR SUCH A UNIT

The object of the invention is the creation of an electrical energy storage set, particularly for an electrical vehicle.

Numerous vehicles operating using electrical batteries are known. They generally include an energy storage set placed at their floor, comprising a rigid shell and, inside this rigid shell, a plurality of storage cells (or elementary batteries). Each cell includes a plurality of cathodes and anodes placed within a case, the cells then being connected in series.

The invention is situated within the field of mechanical assembly of energy storage cells to form a set.

Numerous battery sets comprising a plurality of storage cells are known in the prior art.

According to one particular embodiment, these storage cells each comprise a parallelepiped housing comprising, on two of its opposite lateral faces, positioning means capable of cooperating with complementary means of the adjoining cell.

Once the positioning means are placed into cooperation, attachment means which interconnect the housings, two by two, are installed, thus constituting a rigid beam. These attachment means connect the superimposed cross-members in the upper portion of each cell, protruding from the lateral walls of the cells. Attachment means also connect the cells to the shell. In the lower portion, a cross-member is applied for example between each pair of two cells, said cross-member resting on the positioning means and also attached to the bottom of the shell to bond the beam to the shell.

Such an embodiment makes it possible to ensure a good interconnection of the housings as well as good stiffness of the resulting set. However, this embodiment makes cell maintenance operations complex because it does not make it possible to disassemble and to intervene easily on each of the cells. To reach one cell, it is in fact necessary to withdraw the beam formed by the set of cells from the shell, disassemble the connection between the cells and remove the cabling. Likewise, to reassemble the storage set, it is necessary to reassemble the rigid beam using the different cells, re-install the cabling and replace and attaché the beam within the shell.

In addition, the vibrations brought about by the rolling of the vehicle can generate peening, that is plastic deformation, of the connection between the cells, which is likely to bring about breakage of said connection, thus reducing the life span of the set or generating noise.

The invention has as its purpose to propose a system for assembling cells within a storage set which is suited to the use of the set in a vehicle, and particularly one which resists vibrations while still allowing easy disassembly of the set to facilitate maintenance operations. The invention thus has as its objective to improve the life span of the set while optimizing the mechanical design thereof.

To this end, the invention proposes an energy storage set including a plurality of energy storage cells arranged side by side and a rigid shell surrounding these cells, the shell including at least two distinct portions, a first portion of the shell comprising at least one reference wall, consisting in particular of a lower wall, the set also including at least one abutment made in an elastically deformable material which includes at least one wall called the main wall, extending along a plane substantially normal to the reference wall and which is positioned between two of the cells, so that at least one abutment is placed between each pair of adjoining cells, and pressing means designed to press on one face of each of the cells so as to press each cell against the reference wall, the pressing means being attached with release capability to the first portion of the shell.

Thus the cells are arranged side by side in the set without be attached to one another and yet without clashing due to vibrations. The deformable abutments actually make it possible to avoid shocks between cells and thus to adapt to the demanding environment of automotive vehicles, whatever the position of the set therein. The presence of the pressing means also makes it possible to immobilize the cells relative to the shell. Hence the cells can be disassembled independently from one another. To remove a cell from the set, it is in fact sufficient to remove the attachment of the removable pressing means. It is then possible to remove the selected cell to maintain the set without needing to remove all the cells from the set.

Hereafter, it is considered that at least one, and preferably each cell comprises an essentially parallelepiped housing.

According to other advantageous, but not limiting features, regarding the abutments:

at least one dimension of said abutments is smaller than the dimension of the associated wall of the cell. Manufacturing costs are thus reduced by reducing the effective surface of the cells. It is sufficient in fact that the abutments are positioned in strategic places at which the cells are at greatest risk of collision, at least two abutments extend between each pair of cells, in the vicinity of the reference wall and of a wall opposite the reference wall, consisting in particular of the upper wall, which makes it possible to ensure better protection for the cells subjected to vibrations, At least one of the abutments, particularly all the abutments, include two walls designed to run along at least two distinct walls of at least one of the storage cells. The walls of the abutment are preferably essentially perpendicular to each other. Vibrations are thus even better attenuated by also avoiding collisions between the cell and the adjoining wall of the shell, and the cell is braced in two directions. One of these walls could for example be interposed between the cells and the reference wall, particularly the lower, of the shell. Alternatively, one wall can also be substantially perpendicular to the reference wall, particularly the lower one, of the housing, and to the main wall of the abutment, placed between the cells, at least one of the abutments can include a wall extending between the wall opposite the reference wall (the upper wall preferably) and the cell, particularly between the pressing means and the cell. This abutment thus makes it possible to improve the bracing of the cell and reduce the vibrations transmitted to the cell even far from the reference wall, Preferably, each abutment can include three walls running along three distinct walls of at least one energy storage cell. The three walls of the abutment are essentially perpendicular to each other and are designed to accommodate a corner of the housing of an energy storage cell. They thus have a shape complementary to the corner of the cell. They are indeed arranged as the corner of a cube. The set includes more particularly a plurality of abutments, particularly at least 4, preferably 8, each being associated with a corner of the housing of each energy storage cell adjoining the reference wall or the wall opposite to the reference wall. These abutments thus make it possible to brace the cell in three distinct directions and to attenuate vibrations, while avoiding having the cells collide but also avoiding having the cells hit the shell at its lower or upper wall and its side wall. Moreover, the dimensions of the abutments can in particular be reduced with such a configuration. It is in fact not necessary for the abutments, or at least for all the abutments to extend along the walls of the cells. By covering the corners of each housing, any direct contact between each cell and the shell or between adjoining cells is already prevented, Alternatively, of course, the abutments can have any other shape. They can extend only in one direction, and/or run along the wall of one of the cells for the totality of its dimension, According to another variant, the associated abutments are contiguous: one abutment can for example include at least one common wall running along a wall of the shell and the corresponding walls of at least two adjoining cells, extending possibly along the wall of the shell, and comprising at least one wall protruding from the common wall, the or the at least one of the protruding walls forming a main wall extending between two adjoining cells. A single abutment in the shape of a comb or a rail can for example be positioned in the vicinity of the lower or upper wall for bracing all the cells, In particular, at least one abutment can include a first common wall, a second common wall orthogonal to the first common wall and a central wall forming the main wall, orthogonal to the two common walls and connecting them, particularly at mid-width, at the concavity formed by the two common walls, so as to form two concave portions forming the corner of a cube located on either side of the main wall and preferably symmetrical relative to it. In other words, the abutment according to this embodiment is the equivalent of two embodiments with a shape complementary to the corner of the attached cell and contiguous. This configuration makes it possible to limit the number of abutments and the associated cost of manufacture of the set, The abutments can also be combined in the event that they have a simpler shape with pads also made of an elastically deformable material and designed to be positioned on one or the other of the walls of the shell, so as to avoid vibration of the cells against the walls of the shell, The shell can also include on one of its walls, particularly the reference wall or the wall opposite the reference wall, at least one rail providing for the positioning of at least one abutment. At least one abutment can then be configured in the shape of a pad which comprises two symmetrical portions shaped like an L and connected at their apex while still allowing an opening between them, below the apex, to make it possible to engage this pad on a rail of the shell, the two wings being designed to form the main wall of the abutment by being placed between two adjoining cells, The abutments are preferably made of a thermally insulating material, so as to thermally decouple the cells and the shell and to limit heat losses due to contact of the shell with the surrounding air. Obviously, the abutments will not necessarily provide thermal insulation between the cells and the shell by themselves, The abutments are made in particular of an elastomeric material such as rubber or an EPDM or a thermoplastic or a non-metallic cellular material (foam), At least one of the abutments is contiguous with one of the walls of the set (particularly the upper or lower) or is applied to one of these walls. The abutments can alternately also be applied to the cell directly, The abutments can also include several types of non-reverse fittings protruding from one of the walls, particularly from that designed to be placed between the cells, and making it possible to avoid that a cell disengages from the abutments. These non-reverse shapes can possibly cooperate with the housing of the cell, for example by engaging in notches in the housing of the cell or by rubbing against rough or adhesive areas, The abutment can also include a plurality of fins extending parallel to and protruding from one of the walls of the abutment, to cooperate with a wall of the cell so as to allow bracing of the cells no matter what their dimensions in the direction normal to these fins. The tolerances in manufacture of the cells are thus taken into account.

According to other advantageous, but not limiting features, regarding the pressing means:

The removable attachment means associated with the pressing means are configured so as to be closer to the wall opposite the reference wall than to the reference wall. In other words, when the reference wall is the lower wall, these means are preferably located in the upper half of the shell, so as to make them more accessible, The pressing means are preferably designed to press onto the abutment(s) interposed between one of the cells and the wall opposite the reference wall, particularly the upper wall, of the set so as to hold these abutments in place despite the vibrations that they undergo. That is of course not necessary when the abutments are contiguous with the upper wall of the shell. In that case, the upper wall of the shell can serve as pressing means. It is necessary in this case that its mechanical properties be suitable. For this reason, it can be advantageous to have pressing means distinct from the wall opposite the reference wall, The pressing means are configured to provide support only on a maximum of two cells at a time, which makes it possible to better manage the specifications (manufacturing tolerances) of each of the cells. Alternatively, the invention also includes pressing means which press on each of the cells (upper wall of the shell, cross-member extending over the entire dimension of the set), The pressing means comprise an element shaped like an L designed to attach itself to the shell, particularly the first portion of the shell, and to press on one wall of at least one cell, particularly at the interface of two cells. Alternatively, the pressing means can include a strapping made up of two strands of which one linked end is attached to the reference wall of the shell and designed to cooperate in the vicinity of their free end to surround at least one cell, and particularly each cell, The L-shaped element is configured to take several positions relative to a base integral with the shell, particularly its first portion, or lower portion, on which it is placed, so that the position of the L-shaped element can vary slightly in height depending on the configuration of the cells (particularly their manufacturing tolerances). In this manner, the cells can all be correctly blocked by the L-shaped element, Preferably, the L-shaped element and its base each includes a non-zero slope relative to the reference wall of the shell so that all the cells can be correctly pressed against the reference wall, even if their dimension in the direction normal to the reference wall are not strictly identical, The L-shaped element can be designed to accommodate an abutment.

According to other advantageous, but not limiting features, regarding the shell in general:

The shell has an essentially parallelepiped shape,

The shell includes on its reference wall and/or on the wall opposite to the reference wall at least one rail extending substantially perpendicularly to this wall for positioning at least one abutment, said abutment including when appropriate at least two portions designed to position themselves respectively on either side of the rail, as explained above.

These rails make it possible to mark distinct emplacements for each of the cells. Each rail can be a gusset placed for example on a reinforcement. It can extend over the entire dimension of the lower wall of the shell or only over a portion of its dimension, particularly in proximity of each of its ends, The shell also includes removable attachment means for the abutment, relative to the lower wall of the shell, particularly at its rail.

The shell includes, on the one hand, a first portion comprising the reference wall, particularly the lower, and the side walls, and a second portion (forming a cover) including the wall opposite to the reference wall, particularly the upper. This is the simplest solution as regards the ability to disassemble the set and the cells are then extracted from the shell from above. Alternatively, the upper wall can be continuous with the side walls. The shell can also include two half-shells, ne including the upper wall and the other the lower wall. The walls of the shell can also all be independent one from the other.

The present invention also relates to a method for assembling the aforementioned set according to the invention including the following steps:

on a wall designed to form the reference wall, particularly the lower wall, of the set on which are positioned a plurality of elastically deformable abutments, installation of the cells so that at least one abutment is interposed between each pair of adjoining cells, installation of pressing means configured to press against the cells so as to press them against the reference wall of the shell so that these means are removably attached relative to the first portion of the shell including the reference wall.

The method can preferably include a preliminary step of positioning deformable abutments on the reference wall of the shell at predetermined locations on said wall.

The pressing means are preferably attached in the vicinity of the wall of the shell opposite the reference wall so as to be more accessible and make disassembly easier.

The method also includes a step of installing additional deformable abutments on the cells so that these deformable abutments are interposed between two cells in the vicinity of the wall opposite the reference wall of the shell and/or between at least one of the cells and the wall opposite the reference wall of the shell, before attachment of the pressing means relative to the shell.

Figure 2:
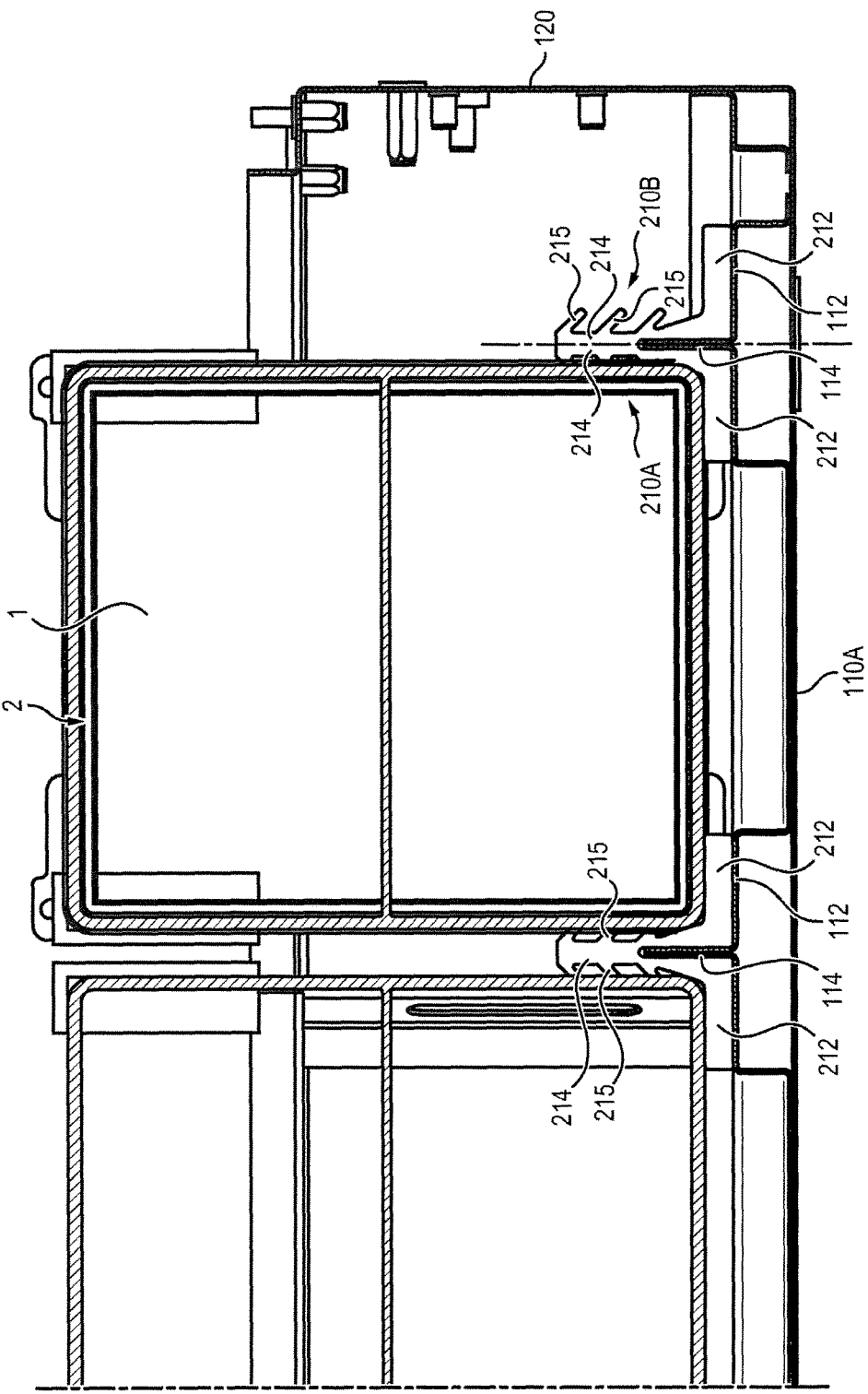
Figure 3:
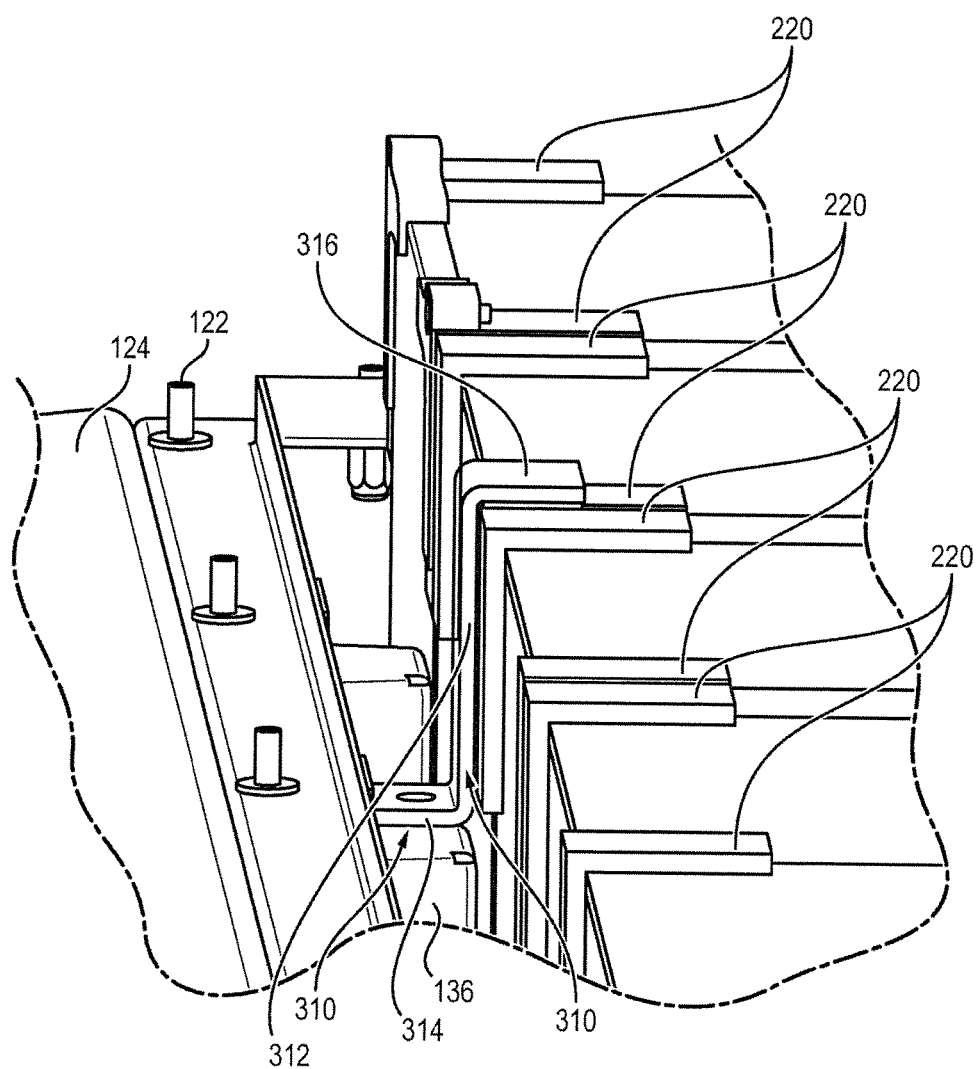
Figure 4:
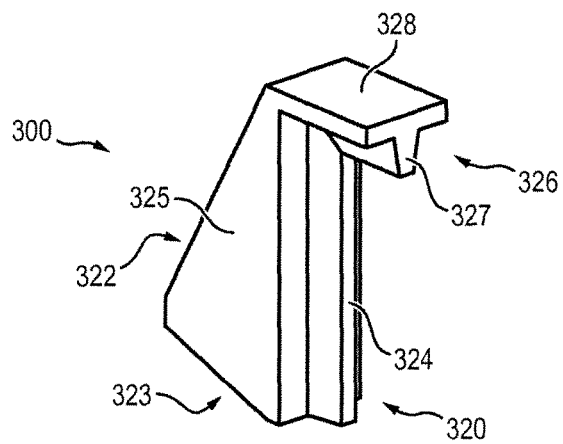
Figure 5:
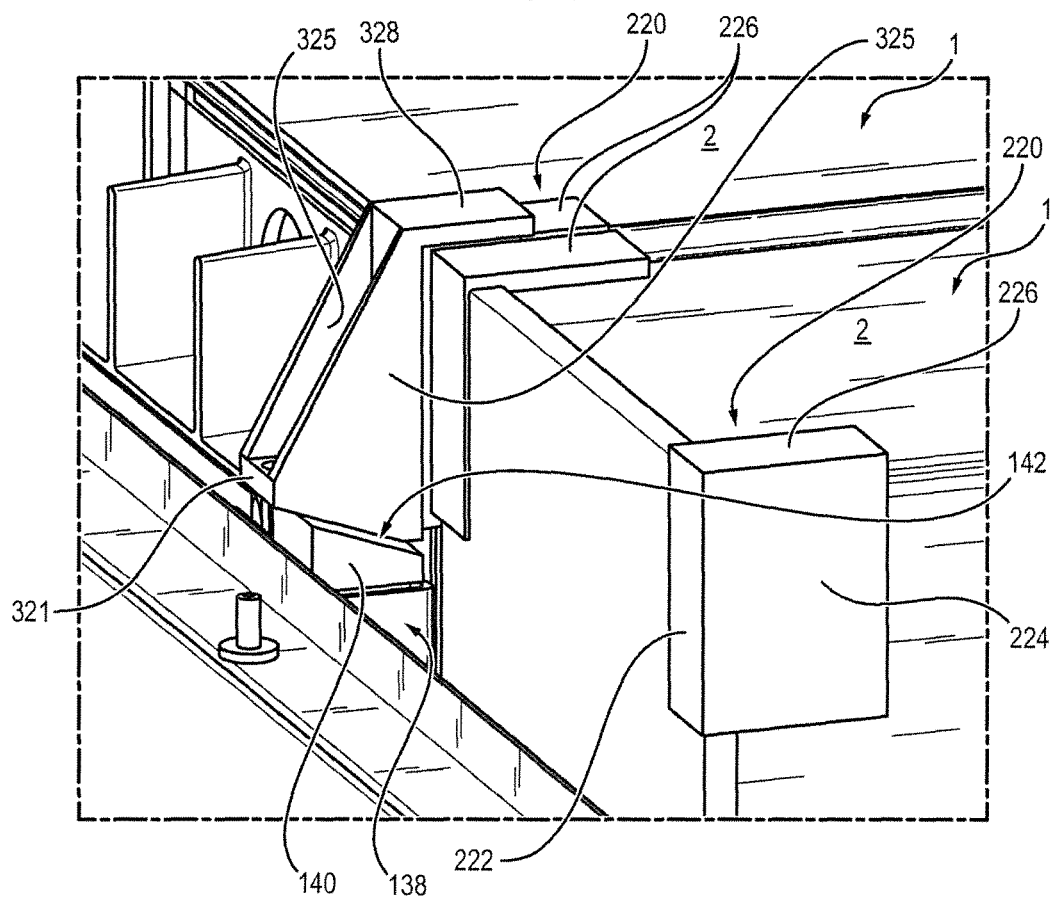
Figure 8:
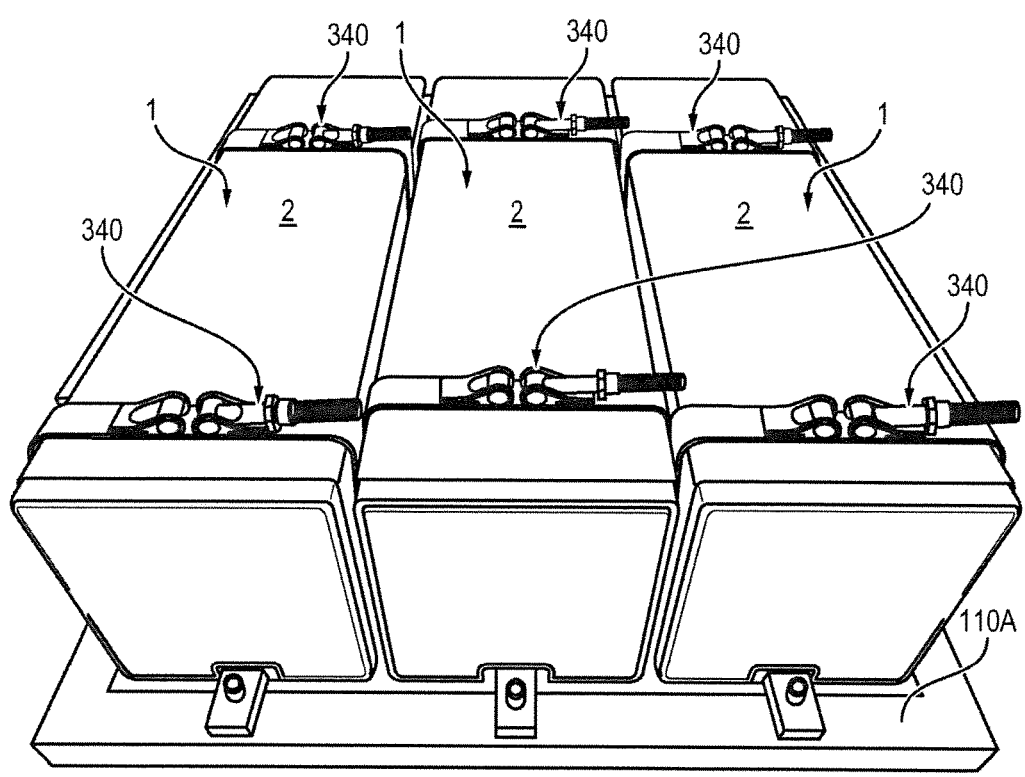

Other features, aims and advantages of the present invention will appear more clearly upon reading the detailed description hereafter, made with reference to the appended figures given by way of non-limiting examples and wherein:

FIG. 1 represents a perspective view of a shell of a set, and illustrates in particular the rails and pads forming abutments carried by this lower wall, and also shows schematically a complementary upper wall, FIG. 2 represents a side view of an end cell in contact with another adjoining cell with interposed abutments, FIG. 3 represents a perspective view of pressing means consisting of levers for supporting in position, FIG. 4 represents a perspective view of a pressing means formed from an L-shaped element, FIG. 5 represents a perspective view of such an L-shaped element installed, FIG. 6 represents a perspective view of an abutment conforming to another embodiment of the invention, FIG. 7 represents a perspective view of another pressing means conforming to the present invention, FIG. 8 represents a variant embodiment of pressing means conforming to the present invention in the form of straps installed on the cells.

As indicated previously, the invention has as its object a storage set including a plurality of energy storage cells 1, to with elementary electric batteries. The example illustrated in FIG. 1 is designed to receive four cells 1, but this number is not restrictive.

Each cell 1 includes a plurality of stacked electrodes (anode and cathode) with interposition of an electrolyte and electrically interconnected. The stack is inserted into a parallelepiped housing comprising terminals for connecting the cell to other electrical components, particularly to other cells. This is known to someone skilled in the art and will therefore not be described in more detail hereafter.

The cells are connected in series through their electrical terminals and form a storage set comprising a shell 10, also parallelepiped, wherein the cells are placed. This general structure is also known to a person skilled in the art.

According to the embodiment illustrated in FIG. 1, the rigid shell includes two half-shells 100A and 100B. The two half-shells can be symmetrical. One of these half-shells, the lower half shell 100A (also called the first portion) is illustrated more precisely in FIG. 1. Each half shell 100 includes one of the walls 110, upper or lower, of the shell and one portion of each of the side walls 120. The walls 110 preferably have a rectangular contour. Each portion of the lateral wall 120 can for example cover half of the height of the shell in the assembled state. The half-shells 100 are attached to one another by any appropriate means, for example using screwing means or dowels inserted into attachment openings 122 formed at the tip of side walls 120 and designed to be located facing complementary openings 123 of the other half-shell 100B (also called the second portion). The shell also preferably includes fins 124 extending at the free end or top of two of the side walls 120, typically two opposite side walls 120, perpendicularly to these walls and toward the outside of these side walls 120 (and parallel to the lower wall 110A). The fins 124 comprise openings 125 for attachment of the set to its environment, to a vehicle for example.

The shell can be formed by assembling two half-shells 100 as illustrated in FIG. 1.

The cells 1 are designed to be arranged side by side in such a shell 10, so that their respective longitudinal directions are parallel, preferably with their output terminals on the same side so as to facilitate their electrical connection.

A first embodiment conforming to the present invention will now be specified with reference to FIGS. 1 to 5.

According to this first embodiment, the lower wall 110A, which is considered here to be the reference wall of the set, includes rails 112 extending parallel to two of the side walls 120, for example perpendicularly to the side walls 120 bearing the fins 124, and parallel to one another, essentially along the entire corresponding dimension of the lower wall 110A. The rails 112 mark the delimitation between the positions provided for each of the cells 1. Each of these rails 112 includes in particular a flat rectilinear wall 114 protruding from the lower wall 110A, essentially perpendicular to it.

Each rail 112 is designed to accommodate two pads 200 made of elastomers in the vicinity of each of the ends of the rail. Each pad 200 forms an abutment.

According to the particular embodiment illustrated in FIGS. 1 and 2, each pad 200 comprises two portions 210A, 210B designed respectively to extend on either side of the wall 114 protruding from the rail 112. These portions 210A, 210B are symmetric relative to the wall 114 of the rail 112. Each portion 210A and 210B has the general shape of an L. The two portions 210A and 210B are connected at their apex. Thus each portion 210A and 210B comprises a first wing 212 essentially parallel to the lower wall 110A and in contact with it, and a second wing 214, perpendicular to the wing 212 and parallel to the wall 114 of the rail 112 and in contact with it. The two portions 210A, 210B are connected at the upper end of their second wing 214. They are in fact contiguous at this location. The pad 200 however comprises an opening between the two wings 214, below its apex, to allow each pad 200 to engage on the wall 114 of the rail 112. Each of the pads 200 is likely to be in contact with two distinct cells 1 (with the exception of the pads 200 located on the extreme rails, located closest to the lateral walls of the shell, like those illustrated on the right side of FIG. 2), the portions 210A, 210B being respectively in contact with one of the two cells 1.

The second wing 214 of each of the portions 210A and 210B of each pad 200 comprises anti-reverse shapes, to wit spurs or lips 215 protruding from the second wing 214 and directed to as to be tilted toward the first wing 212 and thus toward the lower wall 110A of the shell 10. These shapes 215 can possibly cooperate with relief shapes formed on the housing of the cells (depressed recesses or protruding fins) and allow better holding of each cell 1 in the set.

In the embodiment shown in FIG. 2, the housing of the cells does not comprise particular shapes complementing the lips 215. The holding of each cell 1 is provided solely due to rubbing between the housing and the lips 215. In fact, due to tilting toward the first wing 212 of the lips 215 of the pads 200, these lips can easily be bent when the cells are slipped into the shell 10 from the top downward. In other words, the lips 215 move aside when the cells are inserted into the shell 10. It is however more difficult to displace the cells 1 upward, once their installation is completed, because the lips 215 are pre-loaded so that they oppose removal of the cell 1. The cells are thus effectively held at the lower wall 110A of the shell 10. Moreover, the vertical wings 214 of the pads 200, placed between each pair of adjoining cells 1, avoiding having the cells collide with one another when they are subjected to vibrations such as those caused by a rolling vehicle. The horizontal wings 212 make it possible to avoid destructive contact between the lower wall 110A and the cells 1 when the vehicle is in use. The abutment 200 is advantageously made of EPDM which makes it possible to confer a certain elasticity on it and also to thermally decouple each cell 1 from the other elements of the set and particularly from the shell 10, this material being thermally insulating.

As can be seen in FIG. 1, the shell 10 and in particular the side walls 120 thereof also preferably include means 130 for reinforcing the shell. These reinforcing means 130 include in particular blocks 132 located on the side walls 120 extending in the same direction as the rails 112, essentially in the middle of these walls 120 (a single block 132 is visible in FIG. 1). These blocks 132 are for example formed from sheet metal applied to the side walls 120. Each of these metal sheets 132 has a central wall 33, essentially parallel to the side wall 120 of the shell to which it is attached and spaced away from it, as well as two attachment fins 135 located on either side of the central wall 133 of said sheet metal 132 and pressed against the side wall 120 of the shell 10. The sheet metal 132 also includes two tilted walls 134 connecting respectively one attachment fin 135 to the central wall 133.

The reinforcement means 130 preferably also include blocks 136 applied to the side walls 120 perpendicular to the rails 112. Hence one of the side walls 120 perpendicular to the rails 112 includes a plurality of blocks 136 formed for example of sheet metal applied to this wall 120, one metal sheet 136 being applied to the wall 120 more particularly at each of the rails 112. Each block 136 has essentially the same shape as the blocks 132 and therefore comprises a central wall 167 spaced away from the side wall 120.

The reinforcing means 130 preferably also include pillars 138 protruding from the side wall 120 opposite to that comprising the blocks 136, facing said blocks 136 and therefore at each rail 112, as illustrated in FIG. 5.

In summary, the reinforcing means 130 provided according to the embodiment shown in FIGS. 1 to 5 preferably include blocks 132 protruding on two opposite parallel faces 120 of the shell, advantageously on the two faces 120 parallel to the rails 112, and respectively the blocks 136 and the pillars 138 on the two other faces 120 orthogonal to the rails 112. The reinforcement means 136, 138 could also serve as positioning means for the abutments 200.

As can be seen in FIGS. 4 and 5, preferably the elastomeric pads 220 are also placed at the upper end of the cells 1, particularly at each corner of the cells 1. These pads 220 are associated with pressing means 300. If appropriate, the pressing means 300 adjoining the two opposite faces 120 of the shell located facing the rails 112 can be identical.

However according to the embodiment illustrated, the pressing means 300 provided respectively in the vicinity of the two faces 120 have different geometries and are illustrated in position respectively on FIGS. 3 and 5. The pressing means could however naturally be of the same geometry in the entire set.

The aforementioned pads 220 have shapes complementary to the corner of the housing of each cell 1. They include three walls 222, 224, 226 perpendicular to one another and arranged as the corner of a cube, each designed to run along one of the walls of the housing in the vicinity of its corner. Such pads 220 make it possible to avoid the cells 1 colliding in their upper portion and avoid destructive contact with the walls of the shell 10, particularly the upper wall 110B.

As indicated previously, the set also includes pressing means 300 to brace the cells 1 provided with pads 200, 220 against the lower wall 110A and hold the pads 220 on the cells 1.

These means 300 can include support levers 310 illustrated in FIG. 3, including a central arm 312 and two end arms 314 and 316 each extending to one end of the central arm 312 and in opposite directions. Such a lever 310 is thus removably attached, for example by screwing, on the upper face of the reinforcing blocs 136 by a first end wall 314 and is configured so that the other end block 316 is supporting the upper faces 226 of the pads 220 placed on two adjoining corners of two adjoining cells 1, thus holding the pads 220 in place on the cells 1 and also pressing the cells 1 against the lower wall 110A.

At the opposite side wall 120, the set also include pressing means 300. These means 300 include an L shaped element 320 placed on a base 140 positioned in the upper portion of each pillar 138. Each base 140 includes an upper face 142 tilted with a predetermined slope relative to the lower wall 110A of the shell. The L-shaped element 320 includes two arms 322, 326 essentially mutually perpendicular. The principal arm 322 (or the longer arm) has a lower end surface 323 with a slope complementary to that of the upper face 142 of the base 140 at its free end. This end 323 of the arm 322 is designed to position itself on the tilted face 142 of the base 140. The second arm 326 is designed to support the upper face of the cells 1 and the pads 220 so as to hold said pads 220 on the respective cells 1 and to press the cells 1 on the lower wall 110A of the shell 10. The cross-section of this arm 326 is a T section including a horizontal branch 328 and a vertical branch 327. The width of the vertical branch 327 of the T decreases as the vertical branch 327 of the T moves away from the horizontal branch 328, as can be seen in FIG. 4, which makes possible better bracing of the cells 1 regardless of their manufacturing tolerances, the vertical branch 327 of the T being oriented toward the interior of the set. In addition, the principal arm 322 has the same sectional shape as the arm 326, that is it includes a longitudinal rib 324 forming the vertical branch of a T also oriented toward the interior of the set. This rib 324, like the vertical branch 327, is designed to be placed between a pair of adjoining cells 1. Like the lever 310, this L-shaped element 320 makes it possible to hold two adjoining cells 1 at their respective transverse ends.

It will be noted that the L-shaped element 320 can be fixed in various positions relative to the base 140 thanks to conventional sliding attachment means, which are of course removable. Such an attachment can be a screw attachment, for example in an oblong opening formed in a sole 321 connected to the principal arm 322. According to the particular development illustrated in FIG. 5 this sole 321 extends on the end of the principal arm 322 opposite to the arm 326 and on the side opposite to the latter. The sole 321 is connected to the longitudinal sides of the main arm 322 by lateral triangular parallel fins 325 visible in FIG. 4.

It is therefore possible to position the L-shaped element 320 with respect to the base 40 in several position so that the arm 326 can assume several heights relative to the base 140 and therefore to the lower wall 110A. The L-shaped element 320 can therefore assume the height that is most suitable for the cells 1 which it must press against the lower wall 110A, depending on the manufacturing tolerances of the cells.

Thus, when it is desired to assemble the set, the deformable pads 200 are first of all placed on the rails 112 of the lower wall 110A, then each of the cells 1 is placed at the position provided for this purpose. A pad 200 is located between each adjoining pair of cells 1.

The pads 220 are then installed at the upper corners of each cell 1 and the different pressing means 310 and 320 are attached to the lower half-shell 100A so that these pressing means 310 and 320 load the upper surface 2 of the cells 1 and press said cells onto the lower wall of the shell. The upper half-shell 100B with a simpler design is then applied to the lower half-shell 100A.

The set method includes steps for installing the rails 112, the reinforcing blocks 132, 136 and 138 on the lower half-shell 100A before the steps described above, if these elements 112, 132, 136 and 138 are not formed in a single part with the walls of the shell.

When it is desired to disassemble a set, it is sufficient to remove the upper half-shell 100B and to unscrew the levers 310 shown in FIG. 3 and the L-shaped elements 320 shown in FIG. 5 corresponding to the cell 1 considered to be defective (4 elements to be unscrewed in all).

The set according to the invention therefore allows good possibilities of disassembly and good holding of the cells 1 in the shell 10, while guaranteeing that the set can operate in the normal rolling condition of the vehicle (particularly despite the vibrations undergone).

A second embodiment conforming to the present invention will now be described with reference to FIGS. 6 to 8.

More precisely, an abutment 230 will be described in particular with regard to FIG. 6, and its system 330 for attachment or pressing onto the shell with regard to FIG. 7, the rest of the set possibly being identical to that described previously with regard to FIGS. 1 to 5.

In this embodiment, all the pads 230 forming abutments are identical, whether they are placed in the lower portion or in the upper portion of the cells.

Like the pads 200 described in the previous embodiment of the invention, the pads 230 can be pressed onto a rail 112 (in the lower portion of the shell 10).

The pads 230 include a first common wall 232, a second common wall 236 orthogonal to the first 232, and a central wall 240, called the main wall, orthogonal to both the walls 232, 236 and which connects them at mid-width at the concavity formed between these walls.

The common walls each run along a wall of the shell (respectively the lower wall 110A for the first common wall 232 and a side wall 120 for the second common wall 236) and also the corresponding wall of each of the cells. The central wall 240 is, for its part, designed to extend between cells.

The pads 230 thus have a plane of symmetry which passes through the mid-thickness of the central wall 240.

The pads 230 thus include two concave portions 230A, 230B shaped like the corner of a cube located on either side of this central wall 240 and symmetrical relative to it.

The portions 230A, 230B are designed to be respectively in contact with the corner of one of the cells 1 belonging to a pair of adjoining cells 1.

The lower horizontal wall 323 is designed to extend between each cell 1 and the lower wall 110A of the shell 10 and the vertical wall 236 is designed to extend between each cell 1 and the side wall 120 of the shell 10. Each of the walls 232 and 236 extends on either side of the central wall 240.

The central wall 240 is provided with fins 242 protruding essentially parallel to one another and tilted in the direction of the wall 232 as already shown in FIG. 1. The wall 236 is also provided with fins 237 protruding essentially parallel to one another and tilted in the direction of the central wall 240. These fins 242, respectively 237, which are intended to be compressed while deforming against the wall 240, respectively 236, when a cell 1 is inserted into the shell 10, allow bracing of each cell 1, regardless of its dimension in the directions normal to the walls 140 and 236, the fins 242, 237 deforming more or less while folding more or less toward their respective all 240, 236 depending on the dimensions of the cell 1. Each cell 1 is also held in place due to rubbing of the fins (equivalent to the non-reverse shapes 215 described in the previous embodiment).

It is also noted that the fins 237 make it possible to brace each cell 1 along a dimension perpendicular to that of the fins 237, even if dimensional variations are noted in this direction.

As has been indicated, these pads 230 are installed in the lower portion of the set by cooperation of their shapes with a rail 112 as shown in FIG. 1, and inserted as already indicated in FIG. 2 into an opening 244 in the abutment located at mid-thickness of the central wall 240. The rail can also be subject to many embodiments. Preferably the rail 118 does not extend over the entire dimension of the set, but has a shape complementary to the wall 232, having therefore the same longitudinal dimension as the opening.

In the upper portion, the set also includes pressing parts 330 replacing the levers 310 and the L-shaped elements 320 of the previous embodiment.

The part 330 also has a generally L shape formed by two generally mutually orthogonal main walls 332, and 336. The wall 332 is essentially parallel to a side wall 120 of the shell 10 when in use. The wall 336 is essentially parallel to an upper wall of the shell 10 when in use.

The wall 332 is provided at its lower end opposite to the wall 336 with a fin or sole plate 331, essentially perpendicular to the wall 332 and designed to be placed at the end of a block such as 136 of the shell 10. Variations in height can be managed in this configuration using the fins 242 of the abutment. The sole 331 could however, as a variant, be oblique as previously presented in FIG. 4. This fin 331 comprises an oblong hole 333 for attachment f the part 330 of the block 136, so that the part 330 can take on several positions relative to the pillar 138 depending on the dimensions of the cell 1 according to the normal direction of the wall 332.

It is also noted in FIG. 7 that the wall 332 includes a recess 334 directed toward the interior of the concavity of the part 330, which can allow if necessary the passage of an electrical connection means such as cabling.

As previously in the L-shaped element 320, this part 330 includes a central rib 337 on the inner face of its wall 336. The rib 337 is designed to be placed between two adjoining cells 1, vertically above the rail in the lower wall 110A. The rib 337, onto which is attached the pad 230, has a chamfer 338 at the end opposite the wall 334.

The rib 337 can be applied by clipping to the part 330, as illustrated in FIG. 7. It can also be contiguous with it.

Of course the present invention is not limited to the embodiments described, but extends to any variants conforming to its spirit.

It will be noted in particular that the set according to the invention and the set procedure are not limited to what has been describe above, in particular:

The positioning blocks 132 and 136 are optional, just as are the upper pads 220, The pads or abutments 200, 220, 230 are not limited to the forms described. In addition, the abutments 200, 220, 230 described can be placed at other locations in the set, particularly in the upper portion thereof, the abutment can for example include at least one common wall running along a wall of the shell over its entire dimension and also a plurality of walls protruding from the common wall(s), these walls being designed to form main walls extending between each pair of adjoining cells. The abutment in this embodiment has the shape of a comb, The pads 200, 220, 230 can be molded with (particular overmolded over) one of the walls 110 or 120 of the set.

A single pad 200, 220, 230 can extend between two adjoining cells 1,

The pressing means 300 can all be identical (a single type of part, L-shaped element 320 or 330 or lever 310) for one embodiment, In particular, in the design of the first embodiment illustrated in FIGS. 1 to 5, the shell 10 can include identical pillars 138 over its entire perimeter, the parts 300 forming pressing means also possibly being of a single type, The pressing means 300 can consist of the upper wall 110B pressing against the upper face of the cells 1, The pressing means 300 can consist of one or more straps 340 formed by two strands of which one linked end is connected to the lower wall and designed to cooperate in the vicinity of their free end so as to surround at least one cell, preferably each of the cells 1 separately, as shown schematically in FIG. 8, The same pressing means 300 can press all the cells 1 against the lower wall 110A (in the form of a holding cross-member for example), The form of the shell 10 is not limited to two half-shells 100 as illustrated in FIG. 1, The shell can be furnished so that the wall through which the defective cells 1 are removed from the shell is not the upper wall, but rather another wall. In this case, the reference wall could be another wall than the lower wall.

The invention claimed is:

1. An electrical energy storage set including:
   a plurality of energy storage cells (1) positioned side by side, and
   a rigid shell (10) surrounding the cells (1), the shell (10) including at least two distinct portions (100A, 100B), a first portion of the shell comprising at least one reference wall, particularly consisting of a lower wall (110A), including:
   at least one abutment (200, 220, 230) made of an elastically deformable material which includes at least one so-called main wall (214, 224, 240), extending along a plane essentially normal to the reference wall (110A) and which is positioned between two of the cells (1), so that at least one abutment (200, 220, 230) is placed between each pair of adjoining cells (1), and
   pressing means (300) designed to press on one face of each of the cells (1) so as to press each cell (1) against the reference wall (110A), the pressing means (300) being removably attached to the first portion (100A) of the shell (10) wherein the shell (10) includes, on one of its walls, particularly the reference wall (110) or the wall opposite the reference wall, at least one rail (112) providing for the positioning of at least one abutment (200, 220, 230)
   wherein at least one of the abutments (200, 220, 230) in the form of a pad (200) which includes two symmetric portions (210A, 210B) in the shape of an L and connected by their apex while still providing an opening between two wings (214), below this apex, to allow this pad (200) to engage on a rail (112) of the shell, the two wings being designed to form the main wall of the abutment by being placed between two adjoining cells, and wherein each of said two wings includes on its external surface several parallel fins (237) protruding from said wings and designed to cooperate with a wall of the cell so as to compensate for manufacturing tolerances of the cells (1).

2. The energy storage set according to the claim 1, wherein at least two abutments (200, 220) extend between each pair of cells, respectively in the vicinity of the reference wall (110A) and of a wall opposite the reference wall (110B), consisting in particular of the upper wall.

3. The electrical energy storage set according to claim 1 or claim wherein at least one dimension of said abutments (200, 220, 230) is less than the dimension of the associated wall of the cell (1).

4. The electrical energy storage set according to claim 1, wherein at least one of the abutments (200, 220, 230) includes at least two walls (212, 214; 222, 224, 226; 232, 236, 240) perpendicular to one another which mn along two respective walls of at least one cell (1).

5. The electrical energy storage set according to claim 4, wherein the arrangement of at least one of the walls (212; 222, 226; 232, 236) of the abutment is chosen so that said wall is positioned, either between the cells (1) and a wall of the shell parallel to the reference wall (110A) of the shell (10), or perpendicularly to the reference wall (110A) and the main wall (214; 224; 240) of the abutment.

6. The electrical energy storage set according to claim 4, wherein at least one of the abutments (200, 220, 230)

includes a wall extending between the wall (110B) of the shell (10) opposite the reference wall and at least one of the cells (1) preferably between the pressing means (300) and said cell(s) (1).

7. The electrical energy storage set according to claim 4, wherein at least one of the abutments (200, 220, 230) includes at least three walls (222, 224, 226; 232, 236, 240) orthogonal to one another, running along three distinct wall of at least one energy storage cell (1) arranged so as to form a corner of a cube surrounding a corner of the cell.

8. The electrical energy storage set according to claim 7, further including a plurality of abutments (222, 224, 226; 232, 236, 240) in the shape of a corner of a cube, each associated with a respective corner of each cell (1) adjoining the reference wall (110A) and/or the wall (110B) opposite the reference wall of the shell (10).

9. The electrical energy storage set according to claim 1, wherein a contiguous abutment (200, 220, 230) is associated with different cells (1), the abutment comprising in particular at least one common wall (232, 236) running along a wall of the shell (110A, 120) and the walls of at least two adjoining cells, extending possibly all along the wall of the shell (10) and including at least one wall (240) protruding from the common wall, the or at least one of the protruding walls forming a main wall extending between two adjoining cells.

10. The electrical energy storage set according to claim 9, further including at least one abutment (230) which includes a first common wall (232), a second common wall (236) orthogonal to the first common wall (232) and a central wall (240) forming a main wall, orthogonal to the two common walls (236) and connecting them at the concavity of the two common walls (232, 236), so as to form two concave portions (230A, 230B) shaped as the corners of a cube located on either side of the main wall (240) and particularly symmetrical relative to it.

11. The electrical energy storage set according to claim 1, wherein at least one abutment (200, 220, 230) is made of a thermally insulating material.

12. The electrical energy storage set according to claim 11, wherein at least one abutment (200, 220, 230) is made of an elastomer.

13. The electrical energy storage set according to claim 11, wherein at least one abutment (200, 220, 230) is made of a thermoplastic.

14. The electrical energy storage set according to claim 1, wherein at least one of the abutments (200, 220, 230) is contiguous with one of the walls (110, 120) of the shell (10) or applied to one of these walls (110, 120), or applied directly to a cell (1).

15. The electrical energy storage set according to claim 1, wherein at least one of the abutments (200, 220, 230) includes one or more forms of non-reverse shapes (215, 242) protruding from at least one of the walls of said abutment, particularly from the main wall (214, 240) designed to be placed between the cells (1).

16. The electrical energy storage set according to claim 1, wherein the removable attachment means associated with the pressing means (300) are located so that they are Gloser to the wall opposite the reference wall than to the reference wall.

17. The electrical energy storage set according to claim 1, wherein the wall opposite to the reference wall (110B) of the shell serves as the pressing means (300).

18. The electrical energy storage set according to claim 1, wherein at least one of the pressing means (300) is configured to press on a maximum of two cells (1).

19. The electrical energy storage set according to claim 18, wherein the pressing means (300) comprise an L-shaped element (310, 320, 330) designed to be attached to the shell (10), particularly to the first portion of the shell, and to press on one face (2) of at least one cell, designed to mn along the wall opposite to the reference wall (1), particularly at the interface of two cells (1).

20. The electrical energy storage set according to claim 19, further including a base (140) integral with the reference wall (110A) of the shell and having a surface (142) tilted toward so that said L-shaped element (320, 330) can take on several positions relative to this base, so that the position of the L-shaped element (320, 330) can vary depending on the configuration of the cells (1).

21. The electrical energy storage set according to claim 1, wherein the pressing means (300) include a strap (340) formed by two strands of which one linked end is connected to the reference wall (110A) and designed to cooperate in the vicinity of their free end so as to surround at least one cell (1).

22. A method for assembling an electrical energy storage set comprising a plurality of energy storage cells positioned side by side and a rigid shell designed to surround these cells, comprising two distinct portions, a first portion of the shell comprising a reference wall, particularly consisting of a lower wall, the method including the following steps:
installation on one of the walls of the shell (10), particularly the reference wall (110) or the wall opposite the reference wall, at least one rail (112) providing for the positioning of at least one abutment (200, 220, 230),
on the reference wall (110) of the set on which a plurality of elastically deformable abutments (200; 220; 230) are arranged, installation of the cells (1) so that at least one abutment (200; 220; 230) is interposed between each pair of adjoining cells (1),
installation of pressing means (300) configured to press against the cells (1) so as to press them against the reference wall (110) of the shell (10) so that these means (300) are removably attached relative to the first portion of the shell comprising the reference wall (110A)$_1$
wherein at least one of the abutments (200, 220, 230) is in the form of a pad (200) which includes two symmetric portions (210A, 210B) in the shape of an L and connected by their apex while still providing an opening between two wings (214), below this apex,
engaging this pad (200) on a rail (112) of the shell, the two wings being designed to form the main wall of the abutment by being placed between two adjoining cells, and wherein each of said two wings includes on its external surface several parallel fins (237) protruding from said wings and designed to cooperate with a wall of the cell so as to compensate for manufacturing tolerances of the cells (1).

23. The method according to claim 22, further including a previous step of installing the deformable abutments (200, 220, 230) on the references wall (110A) at predetermined locations on said wall (110).

24. The method according to claim 22 or claim 23, wherein additional deformable abutments (200, 220, 230) are installed on the cells (1), so that said deformable abutments (200, 220, 230) are interposed between two cells (1) in the vicinity of the wall opposite to the reference wall and/or between at least one of the cells and the wall opposite the reference wall of the shell, prior to the attachment of the pressing means (300).

\* \* \* \* \*